(12) United States Patent
Hwang

(10) Patent No.: US 11,514,725 B2
(45) Date of Patent: Nov. 29, 2022

(54) INTELLIGENCE DEVICE AND USER SELECTION METHOD THEREOF

(71) Applicant: LG ELECTRONICS INC., Seoul (KR)

(72) Inventor: Taeju Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 255 days.

(21) Appl. No.: 16/885,133

(22) Filed: May 27, 2020

(65) Prior Publication Data

US 2021/0117707 A1      Apr. 22, 2021

(30) Foreign Application Priority Data

Oct. 21, 2019      (KR) .................. 10-2019-0130561

(51) Int. Cl.

| | | |
|---|---|---|
| *G06V 40/00* | (2022.01) | |
| *G06V 40/70* | (2022.01) | |
| *G10L 15/25* | (2013.01) | |
| *G10L 15/26* | (2006.01) | |
| *G06V 20/10* | (2022.01) | |
| *G06V 40/16* | (2022.01) | |

(52) U.S. Cl.
CPC .............. *G06V 40/70* (2022.01); *G06V 20/10* (2022.01); *G06V 40/168* (2022.01); *G06V 40/172* (2022.01); *G10L 15/25* (2013.01); *G10L 15/26* (2013.01)

(58) Field of Classification Search
CPC ...... G06V 40/70; G06V 20/10; G06V 40/168; G06V 40/172; G06V 10/82; G06V 40/161; G06V 40/193; G06V 40/28; G06V 40/16; G06V 40/18; G10L 15/25; G10L 15/26; G06F 3/013; G06F 3/017; G06F 3/005; G06F 3/14; G06F 3/16; G06N 3/0445; G06N 3/0454; G06N 3/084; G06K 9/627
USPC ........................................................ 382/116
See application file for complete search history.

(56) References Cited

U.S. PATENT DOCUMENTS

| | | | |
|---|---|---|---|
| 10,027,888 B1* | 7/2018 | Mackraz ................ G06V 20/47 |
| 2007/0291998 A1* | 12/2007 | Takizawa ................ G07C 9/37 |
| | | | 382/118 |
| 2011/0013038 A1* | 1/2011 | Kim .................... H04N 5/23219 |
| | | | 348/222.1 |
| 2015/0286854 A1* | 10/2015 | Raducan .............. G06V 40/197 |
| | | | 382/117 |
| 2016/0210503 A1* | 7/2016 | Yin ............................ G06T 7/73 |
| 2018/0020156 A1* | 1/2018 | Zobel .................... G06V 10/993 |
| 2019/0050631 A1* | 2/2019 | Hayase ..................... G06T 7/00 |
| 2020/0004333 A1* | 1/2020 | Lee ..................... G06F 3/04817 |

* cited by examiner

*Primary Examiner* — Van D Huynh
(74) *Attorney, Agent, or Firm* — Lee, Hong, Degerman, Kang & Waimey PC

(57) ABSTRACT

Disclosed are an intelligence device and a method of selecting a user of the intelligence device. According to an embodiment of the disclosure, the intelligence device may analyze the eye blinks and pupil shapes of persons and select the person gazing at the intelligence device as a user. According to an embodiment, the intelligence device may be related to artificial intelligence (AI) modules, robots, augmented reality (AR) devices, virtual reality (VR) devices, and 5G service-related devices.

12 Claims, 19 Drawing Sheets

INTELLIGENCE DEVICE AND USER SELECTION METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2019-0130561, filed on Oct. 21, 2019, the contents of which are all hereby incorporated by reference herein in their entirety.

TECHNICAL FIELD

The disclosure relates to an intelligence device and a user selection method thereof, and more specifically, to an intelligence device that analyzes images obtained by capturing the eyes of persons positioned around and recognizes the user who has been grasped as looking at the intelligence device and a user selection method thereof.

DESCRIPTION OF RELATED ART

Recent intelligence devices recognize people's voices and choose the user who has uttered a voice and react.

However, if multiple people are around an intelligence device, it is hard to distinguish the person who desires to use the intelligence device from the others, only with human voices. This is why the people's voices are simultaneously input to the intelligence device, the intelligence device has difficulty in determining who is the user who issues voice commands to the intelligence device among the people.

In such a case, the intelligence device may react to the voice of a person who is not the user, and the user may be unable to use the intelligence device.

SUMMARY

The disclosure aims to address the foregoing issues and/or needs.

The disclosure aims to provide an intelligence device that grasps the gaze directions and distances of people and determines the user who is to actually use the intelligence device.

According to an embodiment, an intelligence device comprises a capturing unit capturing an image or video for persons around the intelligence device, an artificial intelligence (AI) processor recognizing, from the image or video, and analyzing at least one or more of eye blinks, pupil shapes, and hand gestures of the persons, and a display unit displaying user customized information to a person classified as a user of the intelligence device among the persons, wherein content of the user customized information is constituted of information required by the user.

The intelligence device may further comprise a sound output unit capable of outputting information to the user in a voice or sound.

When there are a plurality of users, the display unit may split a screen in the number of the users.

According to an embodiment, a method of selecting a user by an intelligence device comprises capturing an image or video for persons around the intelligence device, detecting respective faces of the persons from the image or video, identifying eyes from the image or video, analyzing an eye blink pattern and pupil shape for each of the persons from the image or video, comparing per-person gaze vector values extracted from the pupil shape and per-person eye blink values extracted from the eye blink pattern, and selecting a user of the intelligence device from among the persons.

The method may further comprise, after selecting the user, displaying user customized information to the user.

Selecting the user may comprise, when there are a plurality of users, recognizing each of the plurality of persons as the user.

The method may further comprise, after recognizing each of the plurality of persons as the user, splitting a screen to correspond to the number of the persons.

Analyzing the eye blink pattern and the pupil shape may comprise setting a plurality of feature points on the faces included in the image or video, comparing the plurality of feature points with feature point data for faces previously stored in the intelligence device, and extracting an eye blink pattern and pupil shape per person using a result of comparison between the feature point data and the plurality of feature points.

Selecting the user may comprise comparing the per-person gaze vector values and determining a distance between the intelligence device and each person using a result of the comparison of the per-person gaze vector values.

The method may further comprise, after determining the distance, recognizing a person with a smallest distance as the user.

The method may further comprise, after capturing the image or video, detecting a person who makes a specific hand gesture from the image or video and recognizing the person making the specific hand gesture as the user of the intelligence device.

The method may further comprise, after selecting the user, steadily capturing the user, detecting the user's mouth from the image or video captured for the user, analyzing a shape of the mouth, recognizing the user's utterance using a result of analysis of the mouth shape, converting the user's utterance into text, and executing a function corresponding to the text or displaying information.

According to the embodiments of the disclosure, the intelligence device may analyze where persons' gazes are directed and recognize the user gazing at the intelligence device as a user. Thus, despite many persons around the intelligence device, the intelligence device may precisely identify the person who tries to use the intelligence device.

According to the embodiments of the disclosure, the intelligence device may analyze the eye blink pattern and pupil shape of the person gazing at the intelligence device and grasp whether she is actually gazing at the intelligence device.

According to the embodiments of the disclosure, when a plurality of persons simultaneously try to use the intelligence device, the intelligence device may set a plurality of users and split the screen as many as the number of the users.

BRIEF DESCRIPTION OF THE DRAWINGS

Accompanying drawings included as a part of the detailed description for helping understand the disclosure provide embodiments of the disclosure and are provided to describe technical features of the disclosure with the detailed description, wherein.

DETAILED DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
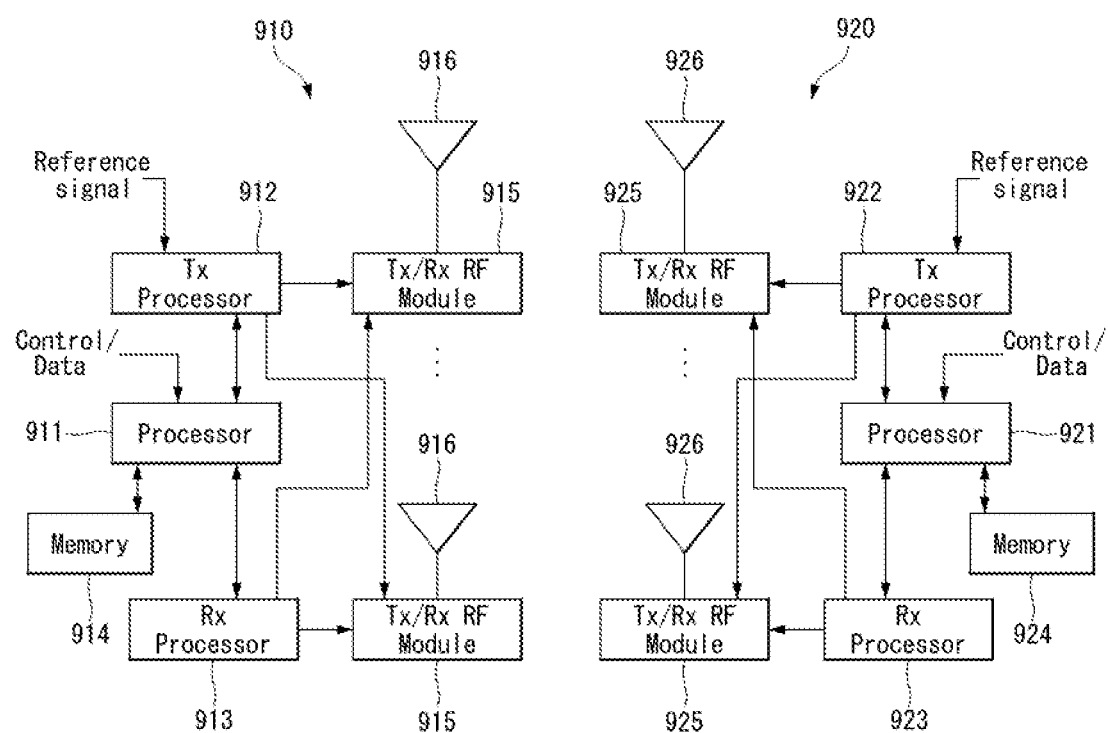
FIG. 1 is a block diagram illustrating a configuration of a wireless communication system to which methods proposed herein may apply.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field. For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
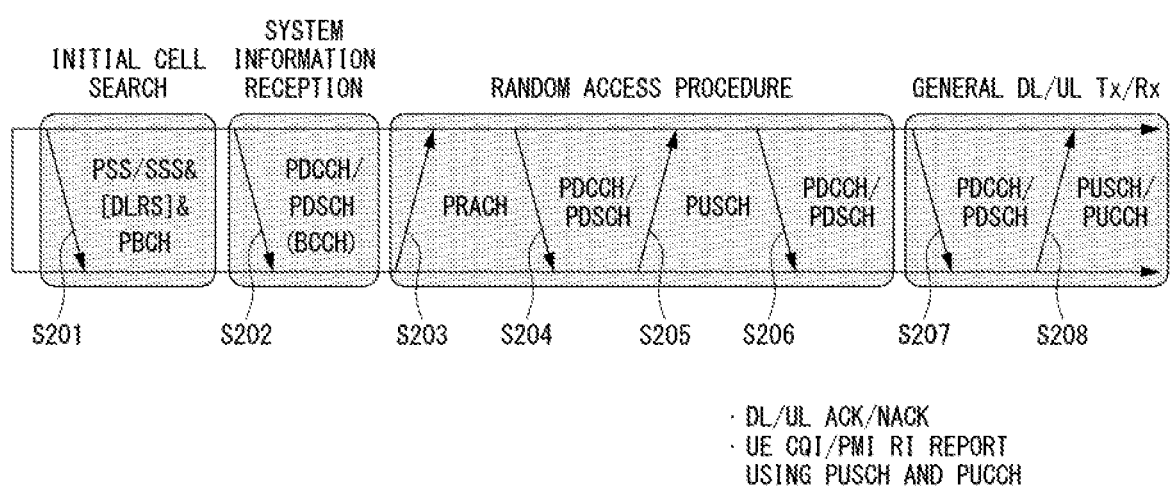
FIG. 2 is a view illustrating an example transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.
Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) returning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
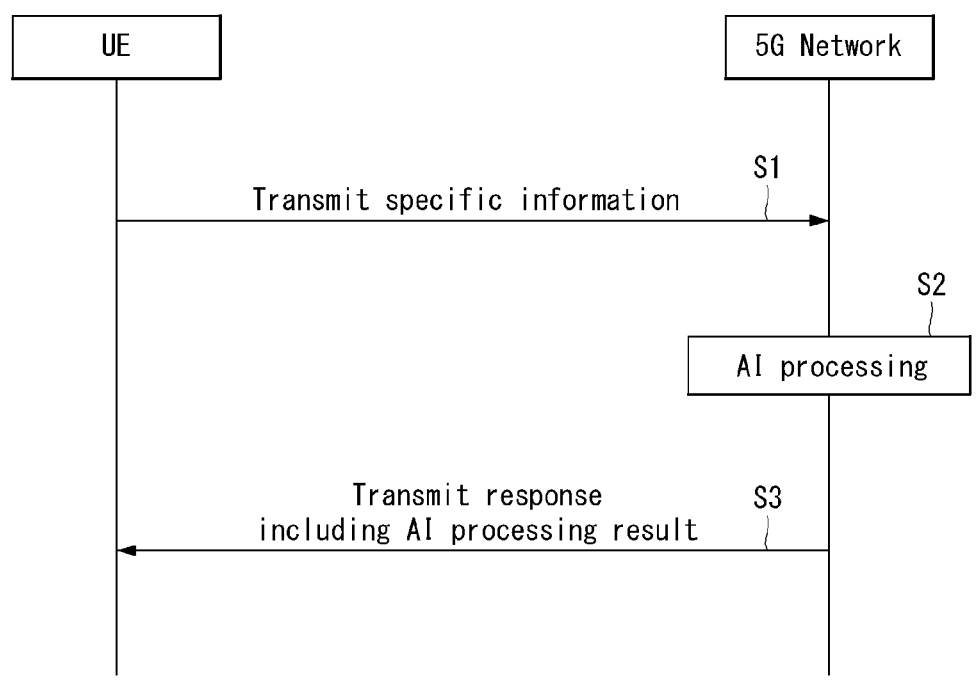
FIG. 3 is a view illustrating example basic operations of a user terminal and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including A processing result to UE(S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

AI Device Block

Figure 4:
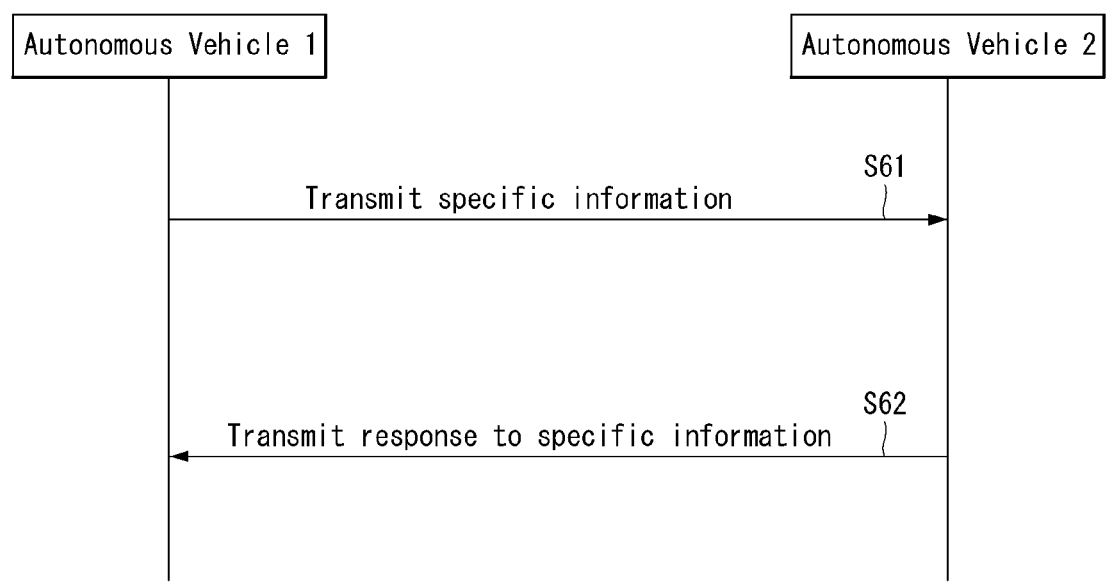
FIG. 4 is a block diagram illustrating an A device according to an embodiment of the disclosure.

FIG. 4 is a block diagram of an AI device according to an embodiment of the present invention.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 4. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 4 was functionally separately described into the AI processor 21, the memory 25, the communication unit 27, etc., but it should be noted that the aforementioned components may be integrated in one module and referred to as an AI module.

An intelligence device according to an embodiment of the disclosure is described below with reference to FIG. 5. According to an embodiment, an intelligence device 200 may include, or consist of, the above-described AI device 20. Thus, according to an embodiment, the intelligence device 200 may be referred to as an AI device 20 and may include the same components as those of the above-described AI device 20.

However, according to an embodiment, to implemented expanded functions over the AI device 20, the intelligence device 200 may include more components than those of the AI device 20. For a better understanding, the AI device 20 and the intelligence device 200 are denoted with different reference numbers. However, the intelligence device 200 may be essentially identical or similar in configuration to the AI device 20 except for the components for performing additional functions, and the terms "AI device" and "intelligence device" may be interchangeably used.

Figure 5:
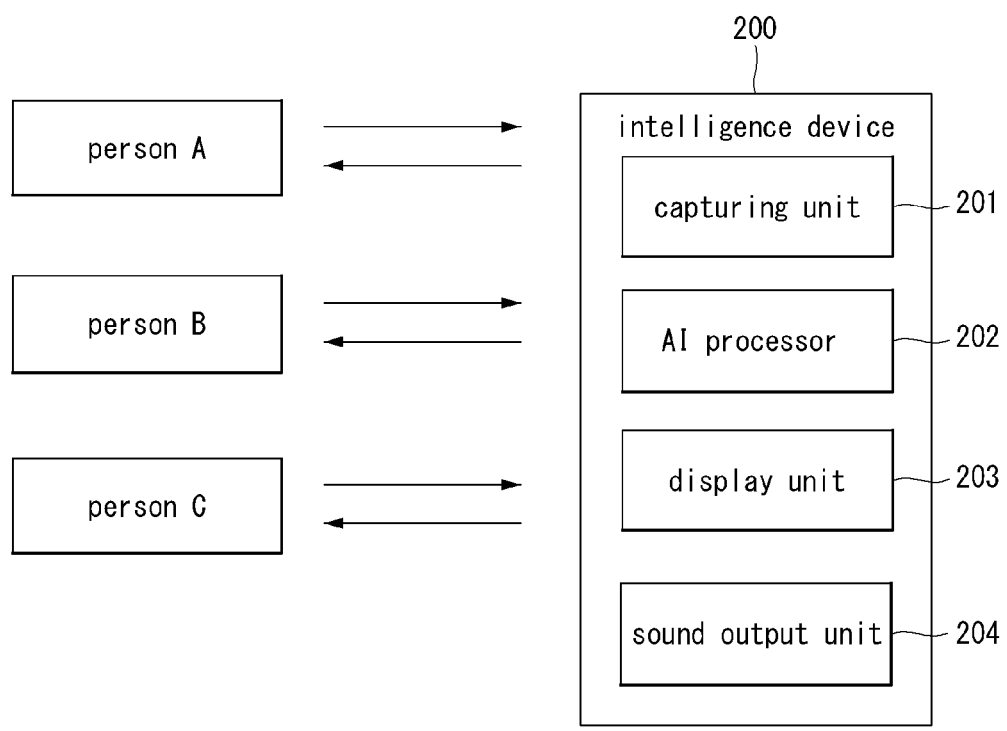
FIG. 5 is a view illustrating a configuration of an intelligence device according to an embodiment of the disclosure.

Therefore, although not shown in FIG. 5, the intelligence device 200 may include an AI processor 21, a memory 25, and a communication unit 27 as does the AI device 20 of FIG. 4. The AI processor 21, the memory 25, and the communication unit 27 of the intelligence device 200 may be integrated into a single module which may be referred to as an A module.

FIG. 5 is a view illustrating a configuration of an intelligence device 200 according to an embodiment of the disclosure. According to an embodiment, the intelligence device 200 is an intelligence device that may capture the people around, detect the faces and eyes from the captured video or image, and analyze where each person looks. Thus, according to an embodiment, the intelligence device 200 includes various devices, from a mobile device, e.g., smartphone, to digital signage which is installed in a predetermined place.

An example in which the intelligence device 200 is implemented as digital signage is described below for illustration purposes.

According to an embodiment, the intelligence device 200 includes a capturing unit 201 (or camera), an AI processor 202, and a display unit 203 (or display device). According to an embodiment, the intelligence device 200 may further include a sound output unit 204 (or speaker).

The capturing unit 201 captures persons A, B, and C around the intelligence device 200 and generates an image or video for the persons.

The AI processor 202 described below in connection with FIG. 5 may perform the same function or role as the above-described AI processor 21. However, the A processor 202 included in the intelligence device 200 described in connection with FIG. 5 and its subsequent figures is denoted with a different reference number from the above-described AI processor 21 so as to avoid confusion.

According to an embodiment, the AI processor 202 recognizes and analyzes the eye blinks, shapes of pupils, hand gestures, and mouth shapes of the persons A, B, and C from the image or video captured for the persons A, B, and C positioned around the intelligence device 200 in addition to the functions of the A processor 21.

The display unit 203, or a display screen, displays user customized information to the person who has been determined as the user of the intelligence device 200 among the persons A, B, and C around the intelligence device 200. The user customized information may include all of the places the user desires to visit and content the user desires to view and may be configured given the user's preference. The user customized information also includes information that the user desires to know although he does not presently.

In particular, if there are a plurality of users that use the intelligence device 200, the display unit 203, or display device, may split the screen in the number of the users.

The sound output unit 204, or speakers, may output, in voice or sound, the user customized information provided from the intelligence device 200 to the user and/or information necessary for the intelligence device 200 to inter-work with the persons around.

A method of selecting a user by the intelligence device 200 is described below with reference to FIGS. 6 to 10, according to an embodiment.

Figure 6:
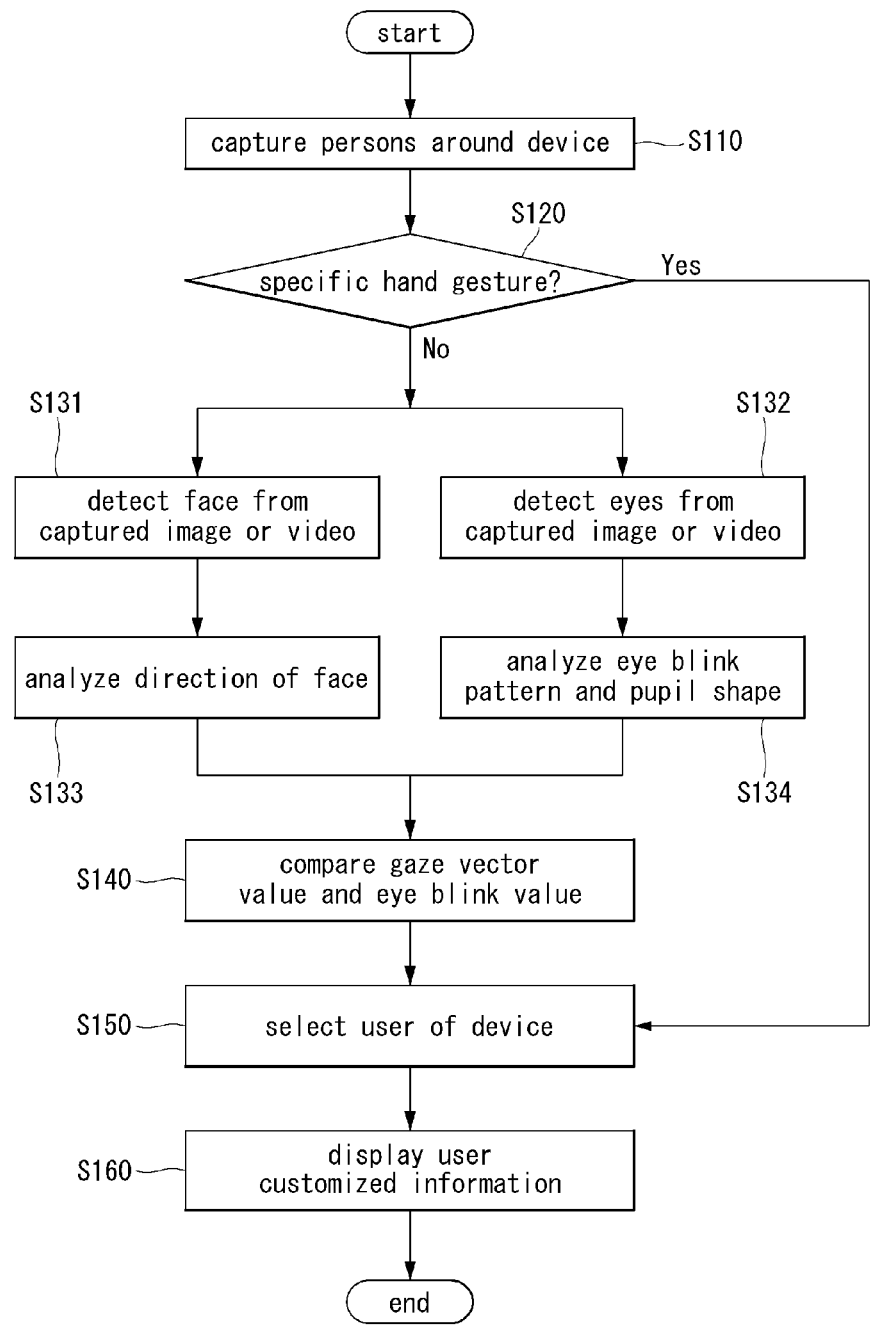
FIG. 6 is a flowchart illustrating a process of selecting a user by an intelligence device according to an embodiment of the disclosure.
Figure 7:
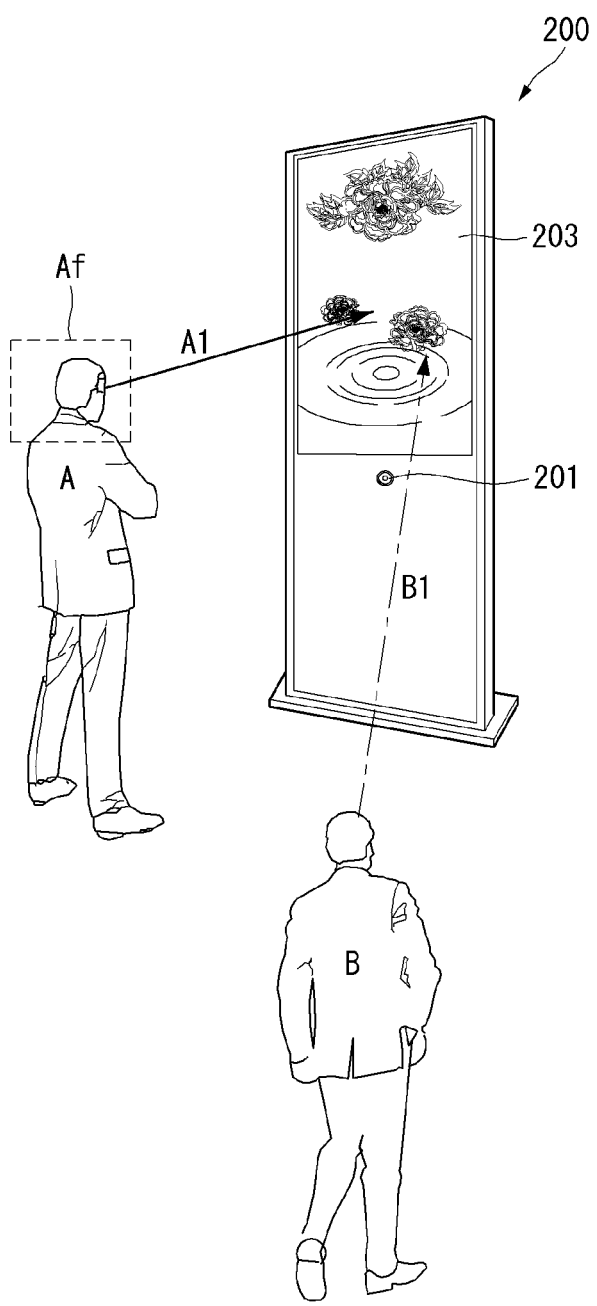
FIG. 7 is a view illustrating an example of capturing persons around an intelligence device by the intelligence device according to an embodiment of the disclosure.
Figure 8:
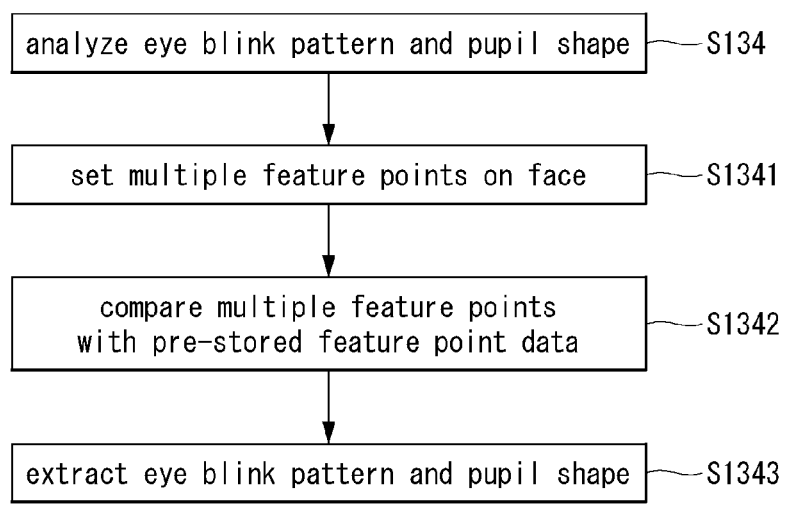
FIG. 8 is a flowchart illustrating a process of analyzing variations in eye blink pattern and pupil shape using feature points by an intelligence device according to an embodiment of the disclosure.
Figure 9:
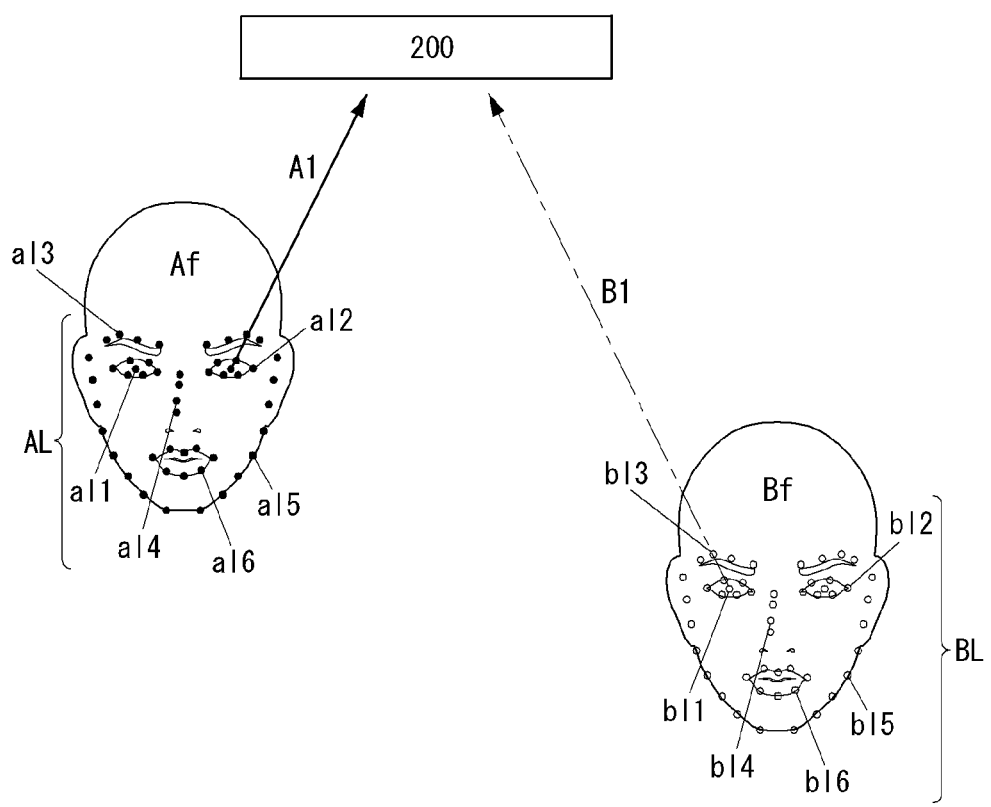
FIG. 9 is a view illustrating an example of setting a plurality of feature points on a person's face by an intelligence device according to an embodiment of the disclosure.
Figure 10:
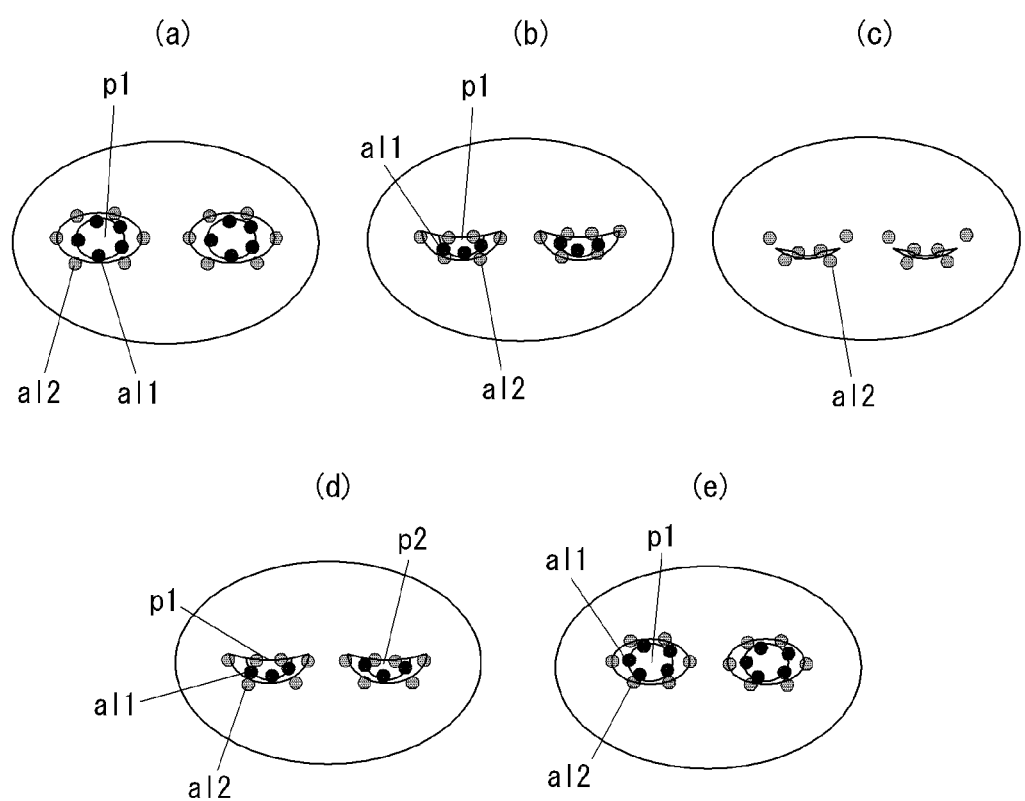
FIG. 10 is a view illustrating an example of setting feature points in an image or video captured for a person's eye blink by an intelligence device.

FIG. 6 is a flowchart illustrating the process of selecting the user by the intelligence device 200 according to an embodiment. FIG. 7 is a view illustrating an example of capturing persons around the intelligence device 200 by the intelligence device 200 according to an embodiment. FIG. 8 is a flowchart illustrating the process of analyzing variations in eye blink pattern and pupil shape using feature points by the intelligence device according to an embodiment. FIG. 9 is a view illustrating an example of setting a plurality of feature points on the face of a person by the intelligence device according to an embodiment. FIG. 10 is a view illustrating an example of setting feature points in an image or video captured for a person's eye blink by the intelligence device according to an embodiment.

Referring to FIG. 6, according to an embodiment, the intelligence device 200 captures persons around the intelligence device 200 (S110).

As shown in FIG. 7, the intelligence device 200 captures each of person A and person B around the intelligence device 200 using the capturing unit 201. The capturing unit 201 (otherwise known as a camera) may include a plurality of lens modules or a wide-angle lens module. The capturing unit 201 may capture all of the persons who are positioned a predetermined distance away from the intelligence device 200 in 360-degree directions. The predetermined distance may vary depending on the performance of the lenses included in the capturing unit 201.

The AI processor 202 determines whether the image or video of the persons A and B captured by the capturing unit 201 includes a person who makes a specific hand gesture (S120). Here, the hand gestures encompasses any hand gesture or motion that includes, e.g., the gesture of raising her arm, with all the fingers and palm open or in a fist.

Upon failing to determine the person who makes the specific hand gesture from the image or video captured for the persons A and B, the A processor 202 detects the faces of persons A and B from the image or video (S131). Referring to FIG. 7, the A processor 202 detects the face Af of person A from the image or video. The A processor 202 detects and differentiates the eyes of person A from the image or video for the face Af of person A (S132).

Detection and differentiation, by the AI processor 202, of the face Af and eyes of person A from the image or video captured for person A may be simultaneously performed, or the face Af may be detected and an image for the eyes may be then detected and differentiated from the image or video for the face Af.

Thereafter, the AI processor 202 analyzes the image or video for the face Af to thereby analyze and elicit the direction in which the face Af of person A faces (S133). The A processor 202 analyzes the image or video for the eyes to thereby analyze and elicit the eye blink pattern and pupil shape of person A (S134). This is for grasping where person A looks indeed. The AI processor 202 may analyze the direction in which person A's face faces, eye blink pattern, and pupil shape, eliciting gaze vector A1 containing the direction in which person A gazes and information for the gaze length.

According to an embodiment, the process (S134) of analyzing, by the intelligence device 200, the direction of face, eye blink pattern, and pupil shape using the AI processor 202 is described below in greater detail with reference to FIGS. 8 to 10.

To analyze the eye blink pattern and pupil shape (S134), the AI processor 202 sets a plurality of feature points AL and BL in face images Af and Bf for persons A and B as shown in FIG. 9.

The feature points AL and BL are set at the pupils al1 and bl1 in the eyes, eyes al2 and bl2, eyebrows al3 and bl3, noses al4 and bl4, facial contours al5 and bl5 including the jawlines, and mouths al6 and bl6 which are spaced apart from each other at predetermined intervals (S1341).

The intelligence device 200 previously stores feature point data for people's faces per gender, age, or race. The feature point data are distinct for eyes, eyebrows, mouth, pupils, or chin in the image or video captured for the people' faces.

The AI processor 202 compares the plurality of feature points AL and BL set on the faces Af and Bf of persons A and B with the pre-stored feature point data (S1342).

The AI processor 202 compares the pre-stored feature point data with the plurality of feature points AL and BL, grasping the direction in which the faces of the persons shown in the captured image or video are directed and the shape of the eyes of the persons. The AI processor 202 extracts the eye blink pattern and pupil shape for each of persons A and B using the grasped results (S1343).

The comparison between the feature point data and the plurality of feature points AL and BL may be performed in such a manner that the positions and number of the feature points AL and BL set in the image or video captured for persons A and B are compared with the feature point data. The AI processor 202 may grasp how away the faces are from the intelligence device 200 according to the inter-feature point intervals al1, al2, al3, al4, al5, and al6.

The AI processor 202 may derive the respective gaze vectors of persons A and B by comparing the plurality of feature points AL and BL with the feature point data. The gaze vector is a value indicating where the gaze of a specific person is directed, as obtained by image-analyzing all of the pupils, eye shape, and face of the specific person. Thus, as shown in FIG. 9, the AI processor 202 derives gaze vector A1 for person A and gaze vector B1 for person B by step S1343 as shown in FIG. 9.

Further, according to an embodiment, the intelligence device 200 may perform feature point setting and analysis, as shown in FIG. 10, so as to grasp the eye blink pattern of the person captured by the capturing unit 201.

Referring to FIG. 10(a) to (f), the AI processor 202 sets a plurality of feature points al1 and al2 at pupil p1 and eye in multiple images or videos captured for the moment the person blinks.

Referring to FIG. 10(a), the person's eyes stay fully open so that the feature points al1 for the pupil p1 and the feature points al2 for the eye al1 are observed. In particular, when the person's eyes are open, the feature points al2 for the eyes remain apart from each other at predetermined intervals.

Thereafter, if the person starts blinking as shown in FIG. 10(b), her upper eyelids come down so that the feature points al2 for eyes vary in position. Further, the intervals between the feature points al2 for eyes reduce. Some of the feature points al1 for pupil p1 are hidden and not observed by the upper eyelid. Such variations in the number of feature points as observed, interval, and position are detected by the AI processor 202.

If the person closes her eyes as shown in FIG. 10(c), the upper eyelids meet the lower eyelids, and the positions of the feature points al2 for eyes vary most significantly, with the intervals between the feature points al2 smallest. None of the feature points al1 for pupil p1 are observed. Such variations in the number of feature points as observed, interval, and position are detected by the AI processor 202.

When the person starts opening her eyes, the upper eyelids begin moving up and so are the feature points al2 for eyes, with the intervals increasing. Simultaneously, some of the feature points al1 for pupil p1 are observed. Such variations in the number of feature points as observed, interval, and position are detected by the AI processor 202.

If the person's eyes are fully open, all of the feature points al1 for pupil p1 and the feature points al2 for eyes are observed, with the feature points al2 spaced predetermined intervals apart from each other, as shown in FIG. 10(f). Since all such variations are detected by the AI processor 202, the A processor 202 may grasp information for the number of blinks, variations in eye shape, and time intervals of blinks for the person captured via the capturing unit 201, generate eye blink pattern data for the person, and derive a blink value from the eye blink pattern data.

The AI processor 202 compares the values for the gaze vectors AI and B1 and blink values between the persons captured by the intelligence device 200 (S140), thereby determining who is gazing at the intelligence device 200 among the persons. The A processor 202 selects, as the user, the person who is gazing at the intelligence device 200 among the persons captured by the intelligence device 200 (S150).

If the user is selected by the A processor 202 (S150), the A processor 202 displays user customized information to the user via the display unit 203.

Figure 11:
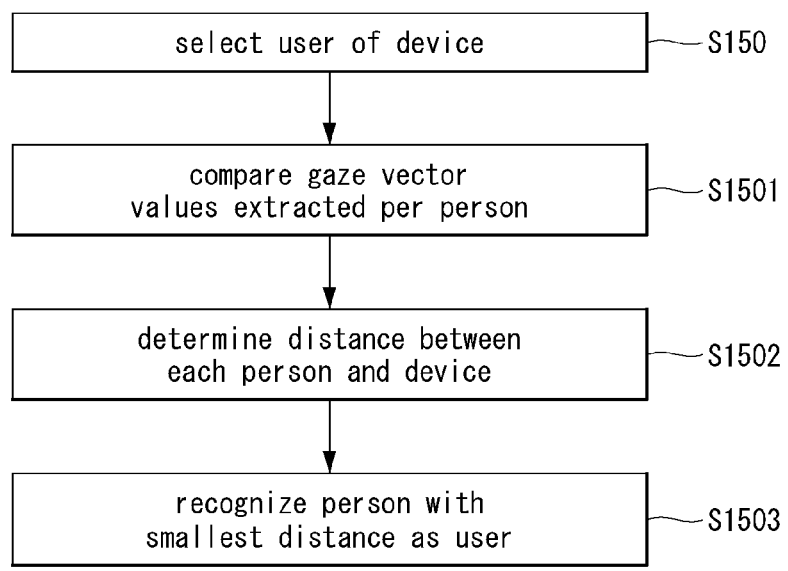
FIG. 11 is a flowchart illustrating a method of selecting a user from among a plurality of persons by an intelligence device according to an embodiment of the disclosure.
Figure 12:
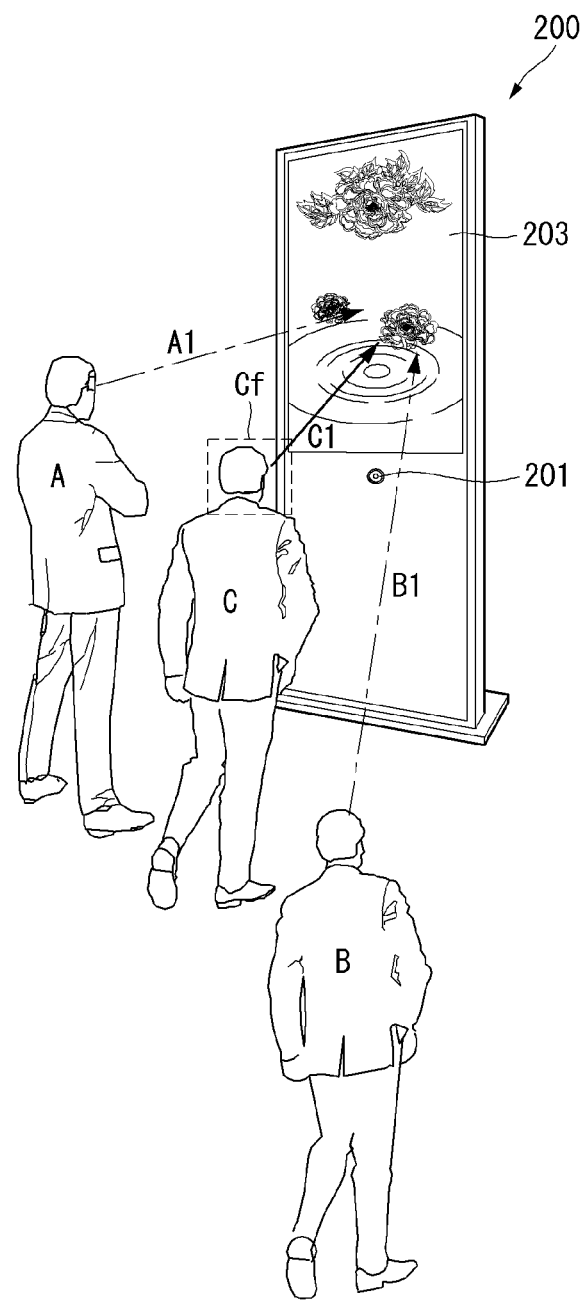
FIG. 12 is a view illustrating an example of capturing a plurality of persons positioned around an intelligence device by the intelligence device according to an embodiment of the disclosure.
Figure 13:
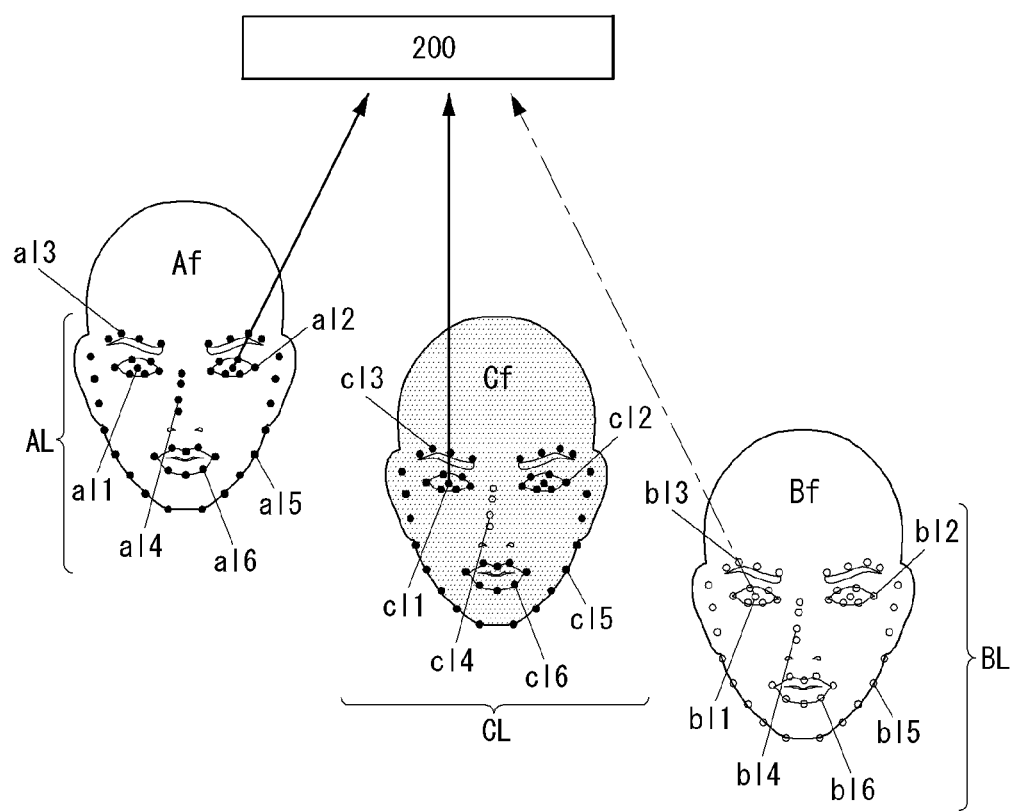
FIG. 13 is a view illustrating an example of setting feature points on the faces of a plurality of persons by an intelligence device according to an embodiment of the disclosure.

If the AI processor 202 determines that a plurality of persons are gazing at the intelligence device 200 in step S134, the AI processor 202 may recognize the person who is closest to the intelligence device 200 as the user as shown in FIGS. 11 to 13. According to an embodiment, the intelligence device 200 may select the person who is positioned closest to the intelligence device 200 as the user.

If the AI processor 202 determines that a plurality of persons are gazing at the intelligence device 200 in step S134, the intelligence device 200 may request the persons to blink so as to identify the user who is to actually use the intelligence device 200 among the persons. The request may be displayed or delivered to the persons around the intelligence device 200 via the display unit 203 or sound output unit 204.

For example, the intelligence device 200 may output the sound "Please look at the device and blink for use" using the sound output unit 204.

FIG. 11 is a flowchart illustrating a method of selecting the user among a plurality of persons by an intelligence device according to an embodiment. FIG. 12 is a view illustrating an example of capturing a plurality of persons around an intelligence device by the intelligence device according to an embodiment. FIG. 13 is a view illustrating an example of setting feature points on the faces of a plurality of persons by an intelligence device according to an embodiment.

Referring to FIG. 11, upon determining that a plurality of persons are gazing at the intelligence device 200 in step S140, the A processor 202 compares the gaze vector values of the persons gazing at the intelligence device 200 in selecting (S150) the user (S1501).

In other words, if persons A, B, and C all are gazing at the intelligence device 200 as shown in FIG. 12, the AI processor 202 compares all of the gaze vectors A1, B1, and C1 of persons A, B, and C to select one user among the persons.

The AI processor 202 have already set feature points on the faces of persons A, B, and C, respectively, in step S134. The AI processor 202 generates the respective gaze vectors A1, B1, and C1 of persons A, B, and C and eye blink pattern data using the feature points.

As shown in FIG. 13, the gaze vectors A1, B1, and C1 contain information for the relationship in position between each person A, B, and C and the intelligence device 200. For example, the gaze vector A1 includes the distance between person A and the intelligence device 200 and information indicating that person A is positioned on the right side of the intelligence device 200. The gaze vector C1 includes the distance between person C and the intelligence device 200 and information indicating that person A is positioned in front of the intelligence device 200.

The AI processor 202 compares the gaze vectors A1, B1, and C1 containing such information (S1501) and identifies the person who is positioned closest to the intelligence device 200, the person who is positioned farthest away from the intelligence device 200, and the person positioned straight in front of the intelligence device 200 (S1502).

Thereafter, the AI processor 202 may recognize and select the person, who is positioned closest to, and straight in front of, the intelligence device 200, as the user (S1503). According to the example shown in FIGS. 12 and 13, the A processor 202 selects person C as the user.

Meanwhile, if the AI processor 202 recognizes that a plurality of persons are away from the intelligence device 200 in similar distances in step S1501, the intelligence device 200 may set a plurality of users, according to an embodiment.

Upon recognizing a person who makes a specific hand gesture in step S120, the intelligence device 200 may assign the right to first use to the person who makes the specific hand gesture, according to an embodiment.

If the user selected in step S150 issues an utterance via the intelligence device 200, the intelligence device 200 may detect the mouth shape of the user and grasp the content of the utterance.

Various functions of the intelligence device 200 are described below with reference to FIGS. 14 to 19.

Figure 14:
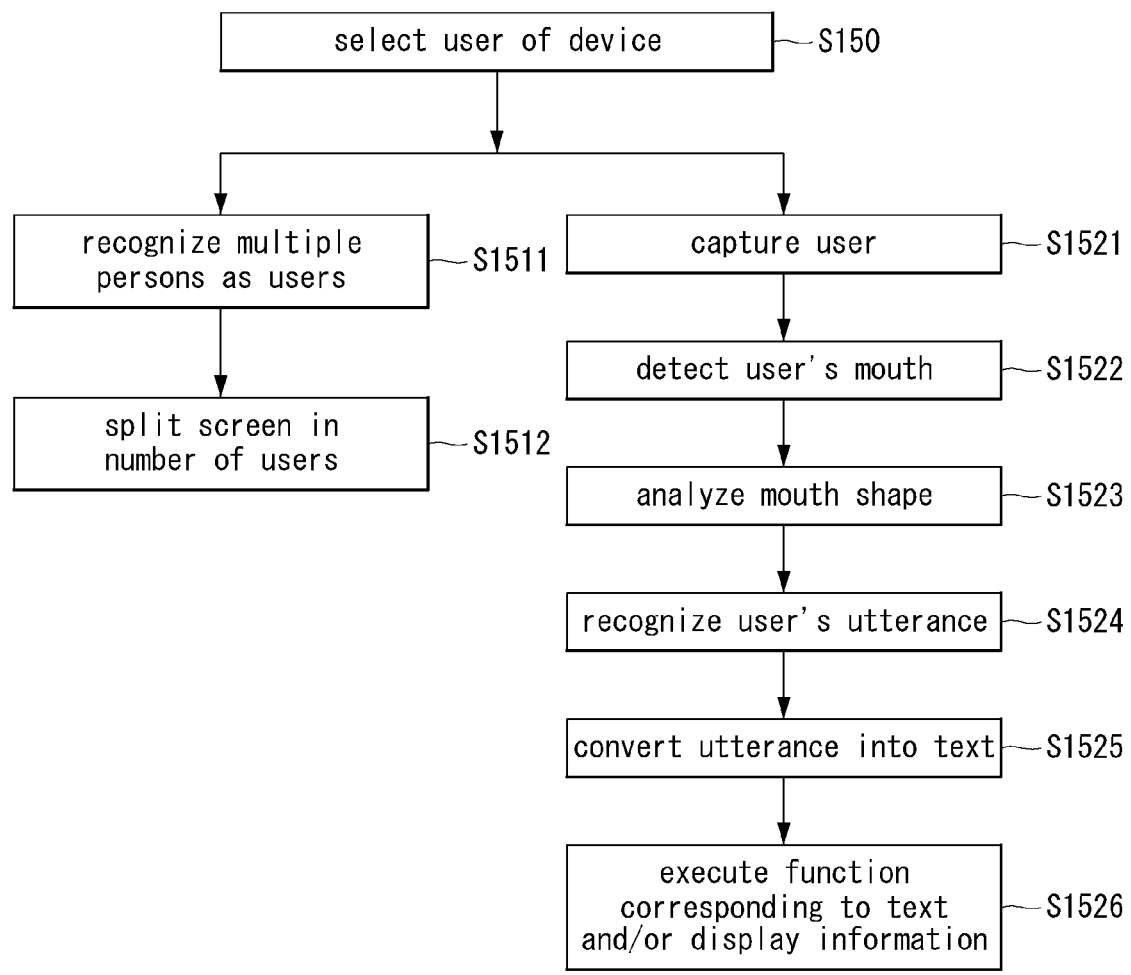
FIG. 14 is a flowchart illustrating a process of implementing a function of an intelligence device having selected a user according to an embodiment of the disclosure.
Figure 15:
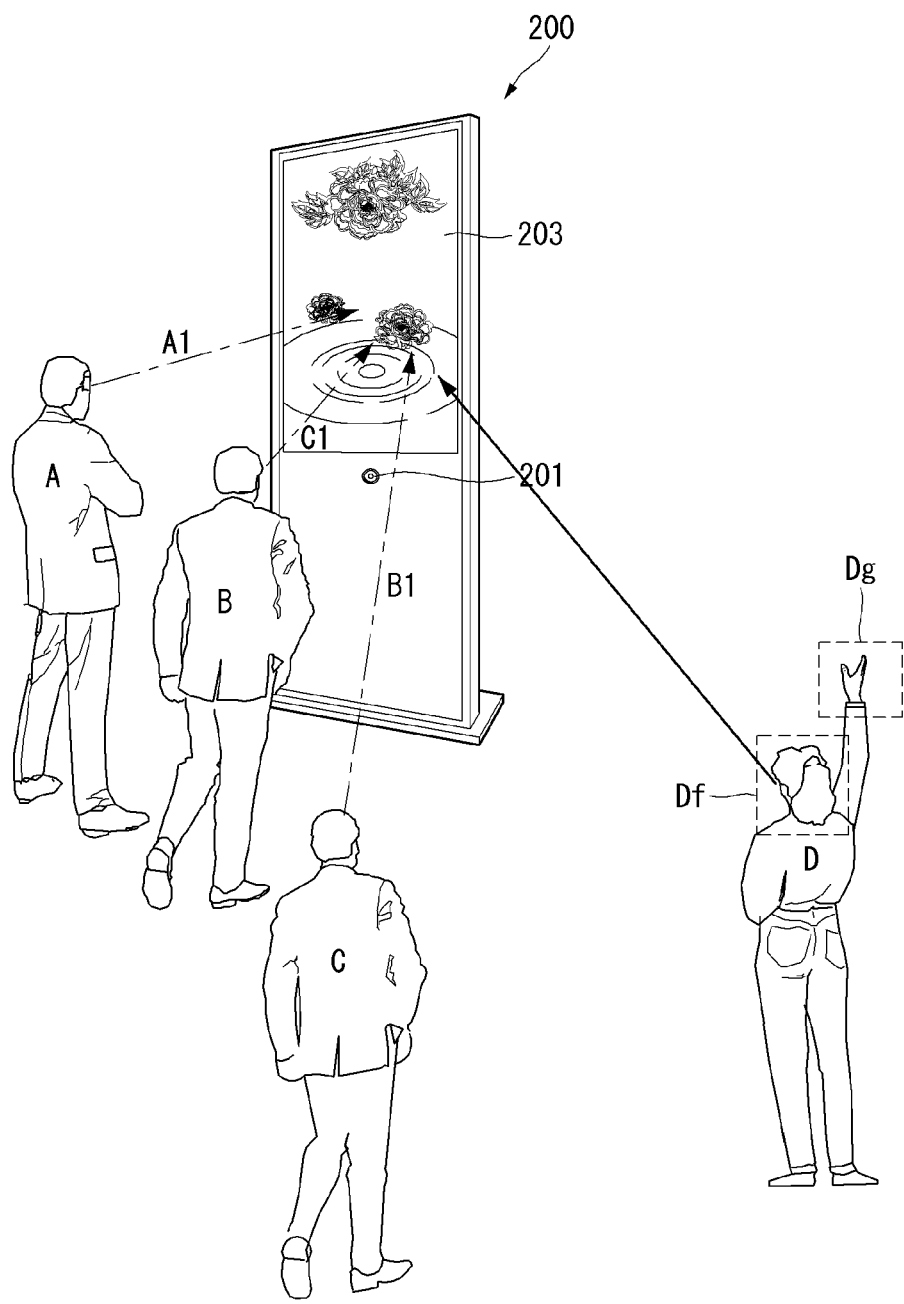
FIG. 15 is a view illustrating an example of capturing a person making a specific hand gesture by an intelligence device according to an embodiment of the disclosure.
Figure 16:
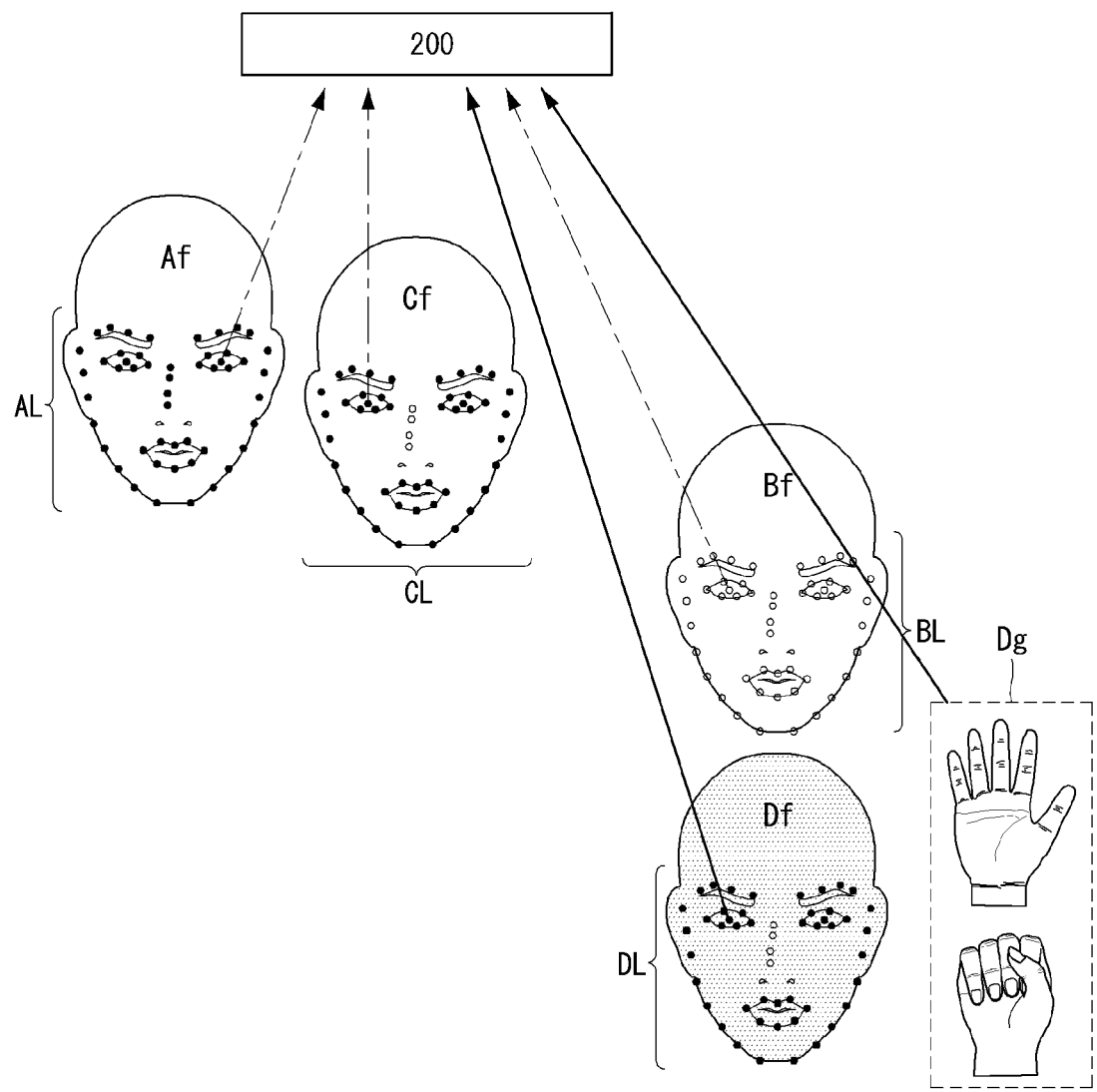
FIG. 16 is a view illustrating an example of detecting a specific hand gesture by an intelligence device according to an embodiment of the disclosure.
Figure 17:
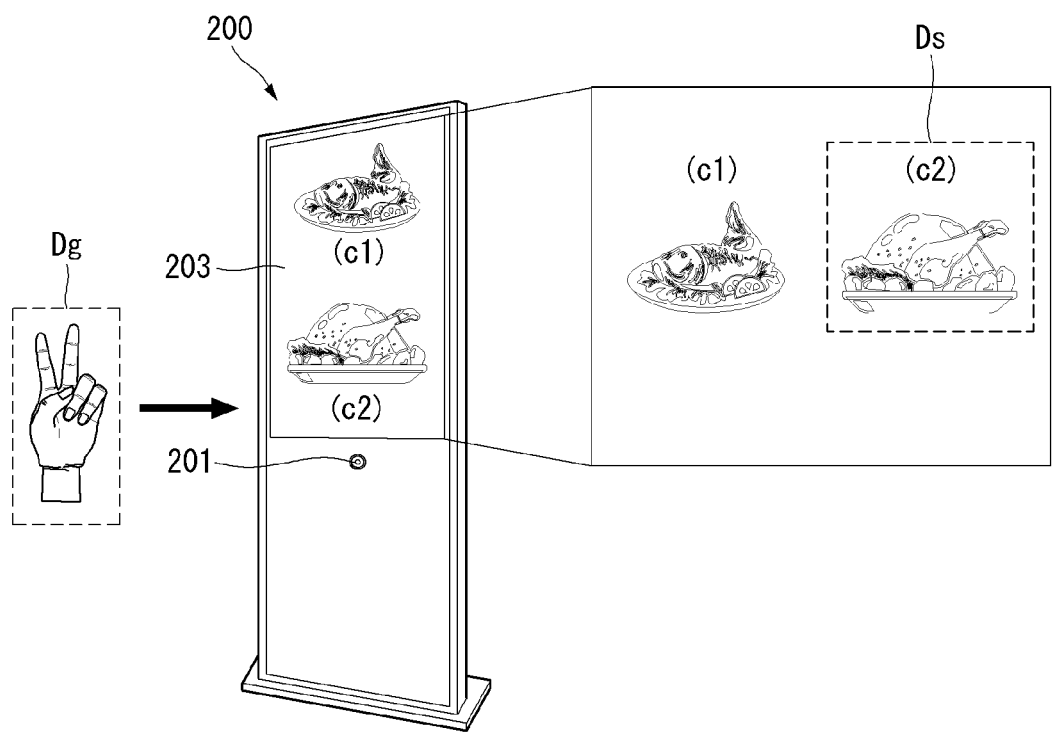
FIG. 17 is a view illustrating an example of selecting content displayed on an intelligence device using a specific hand gesture by a user according to an embodiment of the disclosure.
Figure 18:
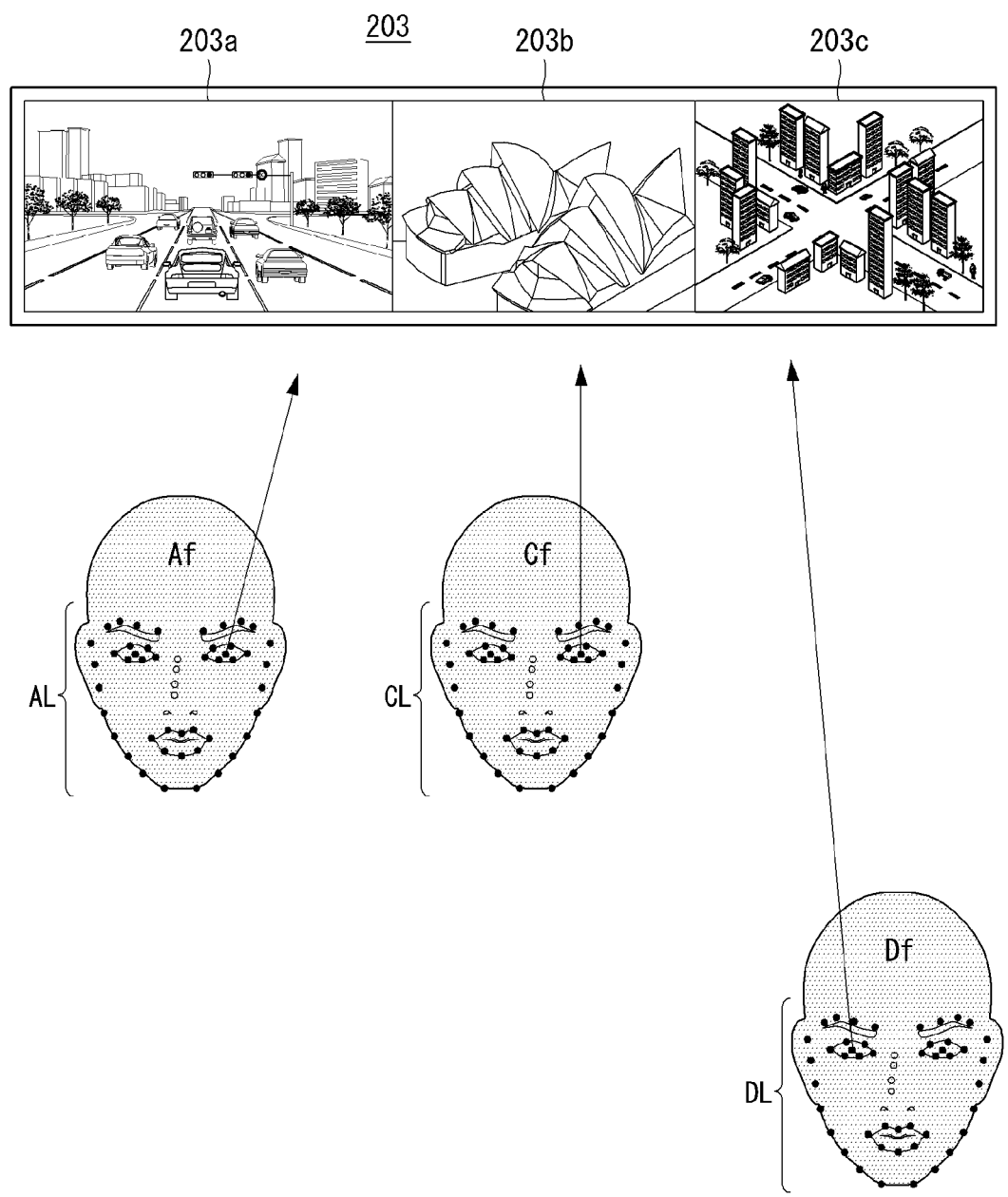
FIG. 18 is a view illustrating an example of splitting the screen in the number of users by an intelligence device according to an embodiment of the disclosure.
Figure 19:
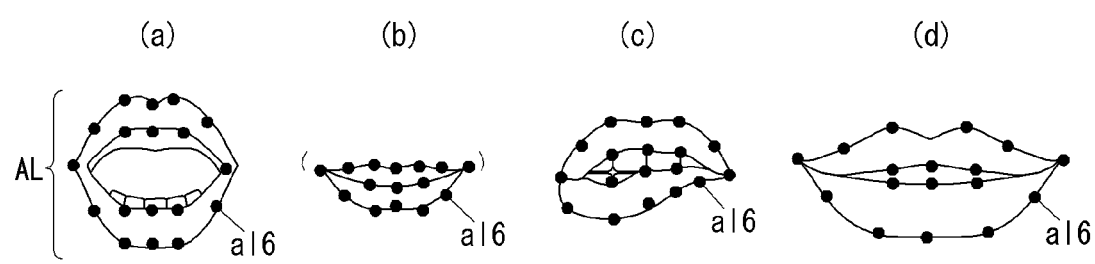
FIG. 19 is a view illustrating an example of setting feature points in an image or video captured for the mouth of a person issuing an utterance by an intelligence device.

FIG. 14 is a flowchart illustrating the process of implementing functions of an intelligence device having selected a user according to an embodiment. FIG. 15 is a view illustrating an example of capturing a person who makes a specific gesture by an intelligence device according to an embodiment. FIG. 16 is a view illustrating an example of detecting a specific hand gesture by an intelligence device according to an embodiment. FIG. 17 is a view illustrating an example of selecting, by a user, content displayed on an intelligence device using a specific hand gesture according to an embodiment. FIG. 18 is a view illustrating an example of splitting the screen in the number of users by an intelligence device according to an embodiment. FIG. 19 is a view illustrating an example of setting feature points in an image or video captured for the mouth of a person issuing an utterance by an intelligence device.

Referring to FIG. 14, upon recognizing that a plurality of persons are away from the intelligence device 200 in similar distances in step S1501, the intelligence device 200 may recognize all of the persons as users (S1511).

In other words, as shown in FIG. 15 as an example, the distance between the intelligence device 200 and person A may be similar to the distance between the intelligence device 200 and person C.

In this case, the intelligence device 200 may determine that both persons A and C are users who desire to use the intelligence device 200 and recognize them all as users.

Since persons A and B are to use the intelligence device 200 for different purposes, the intelligence device 200 may be configured to display different contents to persons A and C. In other words, the display unit 203 may split the screen into two so as to provide independent screens to persons A and C (S1512) and display different contents on the screen 203a provided to person A and the screen 203b provided to person C as shown in FIG. 18. If the intelligence device 200 further recognizes other person D, than persons A and C, as another user, the intelligence device 200 may further split the screen of the display unit 203 and provide an independent screen 203c to person D and display, on the screen 203c, different content than those displayed on the screens 203a and 203b provided to the others.

In other words, the intelligence device 200 may split the screen displayed on the display unit 203 as many as the number of persons recognized as users (S1512), according to an embodiment.

Referring back to FIG. 6, when the AI processor 202 recognizes the person making a specific hand gesture in step S120, the intelligence device 200 may immediately proceed to the step S150 of selecting the user and may recognize the person making the specific hand gesture first as the user (S150).

Referring to FIGS. 15 and 16, the intelligence device 200 may recognize person D who raises her arm, with the fingers and palm open. In this case, if person D's gesture Dg corresponds to the specific hand gesture, the intelligence device 200 may recognize the gesture Dg and detects, intensively and continuously, person D's face Df and gesture Dg via the capturing unit 201.

Person D's gesture Dg may be to raise her arm with the fingers open, but is not limited thereto. For example, person D's gesture Dg may be to raise her arm in a fist as shown in FIG. 16. However, to be recognized as the specific hand gesture by the intelligence device 200, person D's gesture Dg needs to be identical or similar to a gesture pattern previously stored in the intelligence device 200.

If the gesture Dg matches the specific hand gesture or gesture pattern stored in the intelligence device 200, the intelligence device 200 assigns the right to first use to the person who makes the gesture Dg and recognizes her as the user.

The person who has been recognized as the user by the intelligence device 200 may interoperate with, or make use of, the intelligence device 200 using the specific hand gesture on the intelligence device 200.

For example, the intelligence device 200 may display information for a Japanese restaurant c1 and a fast-food restaurant c2 to the user via the display unit 203 as shown in FIG. 17. In this case, the user may use a gesture or motion to select one of the two restaurants.

In other words, the user may make a hand gesture indicating number 2 by simultaneously opening the index finger and middle finger as Dg shown in FIG. 17 and show it to the intelligence device 200, and the intelligence device 200 may recognize the same as the user's command to select the fast-food restaurant c2 displayed the second. Thus, the intelligence device 200 may display a selection cursor Ds on the fast-food restaurant c2, indicating that the user has selected the fast-food restaurant c2 displayed the second.

Referring back to FIG. 14, the intelligence device 200 may steadily capture the person recognized as the user in step S150 (S1521), detect the user's mouth from the image or video captured for the user (S1522), and detect and analyze the mouth shape when the user issues an utterance (S1523). The intelligence device 200 may recognize that the user is issuing the utterance based on a result of analysis of the user's mouth shape (S1524) and convert the content of the user's utterance into text (S1525). The content of the user's utterance which has been converted into text may be display in text via the display unit 203 or may be recognized as the user's command by the AI processor 202 to perform the function corresponding to the content of the text.

Referring to FIG. 19, the intelligence device 200 may observe that the positions of the feature points a16 set at the user's mouth and the intervals between the feature points a16 vary based on the mouth shape that is varied according to the user's utterance.

For example, when the vowel 'ah' is pronounced, the mouth shape is varied as shown in FIG. 19(a) while the intervals between the feature points a16 increase. The AI processor 202 may determine that the user is pronouncing the vowel 'ah' through the variations.

In contrast, if the user's mouth stay closed as shown in FIG. 19(b) or, although the user opens her mouth, the AI processor 202 determines that no movement occurs in the feature points set at the teeth, the AI processor 202 may determine that the user issues no utterance.

Further, if the user opens her mouth but the intervals between the feature points a16 are relatively small as shown in FIG. 19(b), the A processor 202 may detect the user's pronouncing any one of the sounds 'euh,' 'uh,' and 'yu.'

According to an embodiment, the intelligence device 200 captures the persons around, detects and separates the faces and eyes from the image or video captured for the persons, and then detects variations in the eyes and pupils, thereby automatically determining that the user gazing at the intelligence device 200 as the user. Thus, although multiple persons are around the intelligence device 200, the intelligence device 200 may precisely grasp the user who is to actually use the intelligence device 200, according to an embodiment.

To that end, the intelligence device 200 may follow the references below to select the user.

Captures the faces and eyes of the persons around the intelligence device 200, obtains gaze vectors per person, and selects the person with a smaller gaze vector as the user. The gaze vector (value) is a vector including the gaze distance which indicates the distance between the intelligence device 200 and the person.

Compares the gaze vectors elicited per person and, if a plurality of persons have similar gaze vectors, the intelligence device 200 displays a message indicating that the user who is blinking may be selected as the user.

The intelligence device 200 selects the user, who is positioned near the intelligence device 200, is gazing at the intelligence device 200, and is blinking, as the user, among the plurality of persons. When a person blinks 10 times a minute, the intelligence device 200 may determine that the person is normally gazing at something. The reference for the eye blink pattern may be preset by the manager. Further, the intelligence device 200 may previously learn common eye shapes when people open or close their eyes or learn data for people captured and may set determination references for eye blinks or pupil shapes when people gaze at a specific object.

When a plurality of persons all are positioned near the intelligence device 200 and they blink, the intelligence device 200 may recognize the plurality of persons as users and split the screen to correspond to the number of the users so that each user may use an independent screen.

Upon recognizing the person who makes a specific hand gesture, e.g., when the intelligence device 200 recognizes the person who raises her hand among the plurality of persons, the intelligence device 200 recognizes the person raising a hand as the user. When the intelligence device 200 recognizes and selects a first user and, while the first user uses the intelligence device 200, recognizes another person who makes the specific hand gesture, the intelligence device 200 recognizes the person making the specific hand gesture as a second user and splits the screen for the second user.

According to an embodiment, the intelligence device 200 may detect variations in the user's mouth shape and guess the content of the user's utterance.

The above-described embodiments of the disclosure may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet). Thus, the above description should be interpreted not as limiting in all aspects but as exemplary. The scope of the disclosure should be determined by reasonable interpretations of the appended claims and all equivalents of the disclosure belong to the scope of the disclosure.

What is claimed is:

1. An artificial intelligence (AI) device, comprising:
a camera configured to capture an image or video of persons located around the AI device;
an AI processor configured to recognize faces or hand gestures of the persons from the captured image or a frame from the captured video, and to analyze at least one of eye blinks, pupil shapes, or the hand gestures of the persons; and
a display device configured to display user customized information to a person classified as a user of the AI device from among the persons, wherein the person is classified as the user based at least in part on results from analyzing the at least one of eye blinks, pupil shapes, or the hand gestures of the persons,
wherein the user customized information includes information corresponding to the classified user of the AI device.

2. The AI device of claim 1, further comprising a speaker configured to output the user customized information as a sound.

3. The AI device of claim 1, wherein a screen displayed by the display device is split according to a number of the users based on a determination that there are multiple users of the AI device.

4. A method of selecting a user by an artificial intelligence (AI) device, the method comprising:
capturing an image or video of persons located around the AI device;
detecting respective faces of each of the persons from the captured image or a frame of the captured video;
analyzing an eye blink pattern and pupil shape for each of the persons based at least in part on the detected faces;
comparing, between each user, gaze vector values determined by analyzing the pupil shape and eye blink values by analyzing the eye blink pattern; and
selecting the user of the AI device from among the persons based on the comparison.

5. The method of claim 4, further comprising displaying user customized information to the selected user, wherein the user customized information includes information corresponding to the selected user of the AI device.

6. The method of claim 4, wherein more than one of the persons are selected as the selected user based on a determination that there are a plurality of users of the AI device.

7. The method of claim 6, wherein a screen displayed by a display device is split according to a number of the users based on a determination that there are multiple users of the AI device.

8. The method of claim 4, wherein analyzing the eye blink pattern and the pupil shape further comprises:
setting a plurality of feature points on the respective faces included in the captured image or the frame of the captured video;
comparing the plurality of feature points with feature point data for faces previously stored in the AI device; and
extracting, for each of the persons, an eye blink pattern and pupil shape using a result from comparing the plurality of feature points with the feature point data.

9. The method of claim 4, wherein the user is selected based at least in part on determining distances between each person and the AI device.

10. The method of claim 9, wherein the user is selected based on selecting a person with a smallest distance from the AI device.

11. The method of claim 4, wherein a person is selected as the user of the AI device based on detecting a specific hand gesture made by the person.

12. The method of claim 4, further comprising:
after selecting the user of the AI device from among the persons,
capturing an image or a video of the selected user;
analyzing a shape of a mouth of the selected user based on the captured image of the user or a frame of the captured video of the user;
recognizing an utterance of the selected user based on a result from analyzing the shape of the mouth of the selected user;
converting the recognized utterance of the selected user into text; and
executing a function corresponding to content from the text.

* * * * *